United States Patent Office 2,953,423
Patented Sept. 20, 1960

2,953,423

SOLUBILIZATION OF DISSOCIABLE IONIC STRUCTURES

Saul R. Buc, Easton, Pa., assignor to General Aniline & Film Corporation, New York, N.Y., a corporation of Delaware No Drawing. Filed Jan. 29, 1957, Ser. No. 636,861

14 Claims. (Cl. 8—85)

This invention relates to a new process for effecting or increasing the solubility of insoluble, difficultly soluble, and slightly soluble dissociable ionic compounds in polar solvents, and the resultant solubilized compositions.

It has heretofore been known that it is possible to increase the solubility in water of a difficultly soluble class of compounds such as the sulfuric acid esters of leuco vat dyestuffs and salts thereof by the use of certain quaternary compounds. It has been suggested that such solubilization is accomplished through a "complex" formation between the dyestuff ester compound and the quaternary solubilizer.

In the light of this prior teaching of the use of ionic structure to produce increased solubility of the aforementioned dyestuff esters, it was completely unforeseen and unexpected that a non-ionic organic compound would be effective for the above described purpose.

It is therefore an object of the present invention to provide new and useful useful compositions having an increased solubility in polar solvents.

It is a further object of this invention to provide a new and useful process for effecting an increased solubility of ionic compounds in polar solvents.

It is a still further object of this invention to provide a new and useful process whereby an increased solubility in water of relatively water insoluble dyestuffs is obtained.

It is another object of this invention to provide new and useful dyestuff compositions having an increased water-solubility.

Other objects will appear as the description proceeds.

It has been long wanting in the art to provide a means or chemical agent which, in combination with a particular polar-solvent-insoluble ionic material, would increase the solubility of said ionic material. In many fields of technology this is a most sought for quest. Thus in the insecticide, pesticide, herbicide and the like fields many of the compounds employed are substantially insoluble in an aqueous medium and since it is usually most desirable and advantageous to apply such agents from an aqueous dispersion it has heretofore been necessary to prepare such agents in very finely divided forms with the aid of dispersing agents to obtain the desired dispersion. In the dyestuff field and in particular in the vat dyestuff art, this problem of increased solubility is of prime importance. One of the outstanding advantages of vat dyestuffs is their relative insensitivity to water and consequent resistance to bleaching, bleeding and the like; but in order to satisfactorily apply such dyes to textiles and the like it is necessary to have the dyestuff in as fine a state of subdivision as possible and preferably in solution, otherwise weak, non-uniform, unlevel, and specky dyeings are obtained. Initially the vat dyes were merely converted to a reduced form thereof, in which state they were usually more soluble in the dyebath. A later phase in the technological advancement in this art led to the use of the sulfuric acid esters of the reduced vats. These esters, again, usually were characterized by increased solubility in the dye bath. Many vat dyestuffs, however, do not give satisfactory results when these prior techniques are employed due to the extremely low solubility of even such converted vats. As mentioned above, it is known that certain ionic, quaternary compounds will effect an improvement in the solubility of the above described vat dyestuff esters but I have discovered a class of non-ionic organic compounds which will give a similar improvement even though there is no evidence or any possible basis for ascribing this result to a "complex" formation with the dyestuffs as is the case with the ionic solubilizers.

The compounds which may be employed for the purposes and objects of this invention are formylated aromatic amines having the general formula:

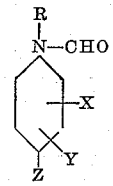

wherein R may be H, alkyl such as methyl, ethyl, propyl, butyl, amyl and the like, or hydroxyalkyl; X may be H, OH, COOH, alkyl such as methyl, ethyl, propyl, butyl, amyl and the like, or hydroxyalkyl, Y may be H, alkyl such as methyl, ethyl, propyl, butyl, amyl and the like, hydroxyalkyl, and Z is hydrogen or

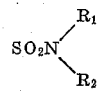

and $R_1$ and $R_2$ may be H, alkyl such as methyl, ethyl, propyl, butyl, amyl and the like, or $R_1$ and $R_2$ may form a heterocyclic ring with the nitrogen atom, e.g., morpholino.

The following compounds are illustrative of the general class of contemplated substances:

(1) N-methyl formanilide
(2) Formanilide
(3) p-Hydroxy formanilide
(4) m-Hydroxy formanilide
(5) o-Hydroxy formanilide
(6) N-formylanthranilic acid
(7) m-Formamidobenzoic acid
(8) p-Formamidobenzoic acid
(9) N-2-hydroxyethyl formanilide
(10) N-methyl-p-nitro formanilide
(11) N-ethyl-p-nitro formanilide
(12) N-ethyl formanilide
(13) o-Formotoluide
(14) 3-chloro-o-formotoluide

(15) N-butyl formanilide
(16) N-butyl-p-nitro formanilide
(17) $N^4$-formyl-$N^4$-methyl sulfanilamide
(18) $N^4$-formyl-$N^4$-ethyl sulfanilamide
(19) $N^4$-formyl-$N^1,N^4$-dimethyl sulfanilamide
(20) $N^4$-formyl-$N^1,N^1,N^4$-trimethyl sulfanilamide
(21) $N^4$-formyl-$N^1$-2-hydroxyethyl-$N^4$-methyl sulfanilamide
(22) $N^4$-formyl-$N^1,N^1$-bis (2-hydroxyethyl)-$N^4$-methyl sulfanilamide
(23) $N^4$-formyl-$N^4$-ethyl, $N^1$-methyl sulfanilamide
(24) $N^4$-formyl-$N^4$-ethyl-$N^1,N^1$-dimethyl sulfanilamide
(25) $N^4$-formyl-$N^4$-ethyl-$N^1$-(2-hydroxyethyl) sulfanilamide
(26) $N^4$-formyl-$N^4$-ethyl-$N^1,N^1$-bis (-hydroxyethyl) sulfanilamide
(27) N-ethyl formamidobenzene sulfonyl morpholine
(28) $N^4$-formyl-$N^1$-(2-hydroxyethyl) sulfanilamide
(29) $N^4$-formyl-$N^1,N^1$-bis (2-hydroxyethyl) sulfanilamide Compounds 9, 14 and 15 may be prepared in the manner described in Organic Synthesis, vol. 20, page 66. Thus, compound 9 is prepared by refluxing for about 2 hours β-hydroxyethyl aniline and an excess of stoichiometric amount of formic acid. The resultant product has a boiling point of 148° at 0.6 mm. Compound 14 is obtained in a similar manner using 6-chloro-2-toluidine in lieu of the aforementioned aniline, and compound 16 is also similarly prepared employing butyl alkyl. The resultant product here has a boiling point of 172° C. at 30 mm. Compounds 11 and 16 may be prepared by the method of Morgan and Grist, J.C.S., vol. 113, page 6810 (1918). Compound 11 is prepared from ethyl formanilide in lieu of the ethyl homolog shown in the reference. The product has a melting point of 79 to 80.5° C. The following illustrates the procedure in preparing this compound. 130 ml. of concentrated sulfuric acid are placed in a flask. To this is added dropwise at a temperature below 10° C. 100 g. of ethyl formanilide. There is then added dropwise at a temperature of 10 to 15° C. a mixture of 42 ml. of concentrated nitric acid and 42 ml. of concentrated sulfuric acid. Thereafter the entire reaction mixture is drowned in ice and water and the desired product precipitates. It is filtered, washed with ice water and air dried. Compound 16 is prepared from compound 15, again using the nitration procedure of Morgan and Grist, as described above for compound 11. Compounds 17 through 29 are prepared in general by the chlorosulfonation of the formylanilides to yield the p-sulfonylchloride derivatives. Treatment with ammonia, amines or hydroxy amines yields the corresponding sulfonamides. The following examples will serve to illustrate the preparation of such compounds.

EXAMPLE A

*Preparation of compound 17*

In a flask with a stirrer and in a bath there are placed 582 g. of chlorosulfonic acid to which there is slowly added dropwise below 25° C. 131 g. of N-formanilide. The temperature is raised to 30° C. and thereafter rises spontaneously to 65° C. After about 10 minutes the temperature begins to drop and at this time it is raised to 70° C. and held at this heat for 1 hour. Thereafter the temperature is raised to 95° C., after which the reaction mass is cooled and drowned in ice water. The p-sulfonyl chloride derivative crystallizes out. After filtering and washing free of acid with ice water, the damp product is treated with an excess of ammonia resulting in the desired p-sulfonamido derivative.

EXAMPLE B

Compound 18 is prepared in identical manner except that an equivalent amount of ethylformanilide is used in place of the methyl of Example A.

EXAMPLE C

Compound 19 is prepared from the sulfonyl chloride of Example A using methylamine instead of ammonia.

EXAMPLE D

Compound 20 is prepared again similarly as the compound of Example A except that dimethyl amine is used instead of ammonia.

EXAMPLE E

Compound 21 is prepared from the crude chloride of Example A by treatment with one equivalent of ethanolamine and excess sodium carbonate solution. The product is isolated by evaporation of the solution to dryness, treating the residue with hot isopropanol and filtering. The product is then finally isolated from the isopropanol by evaporation and crystallization.

The insoluble or slightly soluble dissociable ionic compounds where solubility has been found to be enhanced by the presence of the above agents include:

I. Vat dyestuffs, e.g., sodium salt of the sulfuric acid ester of the leuco form of:
  (a) 1,2-naphthioindigo
  (b) $6,6^1$-dichloro, $4,4^1$-dimethyl thioindigo
  (c) $5,5^1$-dichloro, $7,7^1$-dimethyl thioindigo
  (d) Dibromoanthrone
  (e) Dibromodibenzpyrene quinone
  (f) Dimethoxydibenzanthrone
  (g) $6,6^1$-diethoxythioindigo
  (h) $5,5^1,7,7^1$-tetrabromoindigo
  (i) Dichloro dianthrahydroquinone azine
  (j) Tribromoisodibenzanthrone
II. Fluorescent brighteners
III. Pharmaceuticals
IV. Insecticides, e.g.,
  (a) sodium salt of 2,4-D(2,4,dichlorophenoxyacetic acid)
V. Inorganic salts, e.g.,
  Mercuric chloride
  Silver chloride
  Barium sulfate
VI. Moth protecting agents of the triphenyl phosphonium type The polar solvents in which the increased solubility is manifested include both liquids and low melting solids which have a relatively high dielectric constant such as water, alcohols, e.g., methyl alcohol, ethyl alcohol, isopropyl alcohol and the like, amides, e.g., formamide, dimethyl formamide, acetamide and the like, aromatic hydroxy compounds, e.g., phenol, cresols, and the like, aromatic carboxylic acids and the salts thereof, e.g., benzoic acid, salicylic acid, toluic acids and the like, and salts thereof, aromatic sulfonic acids and their salts, e.g., benzenesulfonic acid, toluene sulfonic acids, α- and β-naphthalene sulfonic acids and the like. The amount of the formylated amine to be employed may vary considerably depending upon the particular ionic compound to be solubilized and the degree of solubilization desired. Thus with the vat dyestuff esters, it is usually sufficient for subsequent dyeing purposes to solubilize in $H_2O$ at least 1% of the dyestuff and preferably as much as 6% (i.e., to obtain a dyestuff concentration of 1 to 6%). Usually from about 1 to 4% of the solubilizing agent (based on the dyebath constituents) is necessary but obviously more may be employed if so desired.

The following examples will serve to illustrate the features of the present invention without being deemed limitative thereof.

EXAMPLES 1–14

Solutions of the following compounds were tested at various concentrations in both water and in 1% sodium chloride aqueous solutions for solubilizing effect on the sodium salt of the sulfuric acid ester of leuco-1,2- naphthioindigo. The purpose of testing in the salt solution is to ascertain the salt sensitivity of the compositions.

| Agent | Concentration of Agent | Percent Dye in H₂O | Solubilized in 1% NaCl |
|---|---|---|---|
| (1) N-methyl formanilide (compound 1) | 1.0<br>2.0<br>4.0 | 2.5<br>4.0<br>5.3 | 3.6 |
| (2) N-ethyl formanilide (compound 12) | 4.0 | 5.3 | |
| (3) N-(β-hydroxyethyl) formanilide (compound 9) | 1.0<br>2.0<br>4.0 | 0.8<br>1.8<br>4.0 | 1.8<br>3.6 |
| (4) o-formotoluide (compound 13) | 6.0 | 5.7 | |
| (5) N⁴-formyl-N¹-2-hydroxyethyl-N⁴-methyl sulfanilamide (compound 21) | 4.0 | 3.0 | |
| (6) N⁴-formyl-N¹,N¹-bis (2-hydroxyethyl)-N⁴-methyl sulfanilamide (compound 22) | 4.0 | 2.8 | |
| (7) N⁴-formyl-N¹-(2-hydroxyethyl) sulfanilamide (compound 28) | 4.0 | 3.2 | |
| (8) p-hydroxy formanilide | 4.0<br>2.0<br>4.0 | 2.2<br>3.1<br>4.5 | |
| (9) N-methyl-p-nitro formanilide | 4.0 | 4.2 | |
| (10) N-butyl formanilide (compound 15) | 2.0 | 3.1 | |
| (11) N⁴-formyl-N¹,N¹,N⁴-trimethyl sulfanilamide (compound 20) | 4.0 | 3.6 | |
| (12) N⁴-formyl-N⁴-ethyl-N¹,N¹-bis (-hydroxyethyl) sulfanilamide (compound 26) | 2.0 | 2.5 | |
| (13) N-ethyl formamidobenzene sulfonyl morpholine (compound 27) | 4.0 | 3.9 | |
| (14) N⁴-formyl-N¹,N¹-bis (2-hydroxyethyl) sulfanilamide (compound 29) | 4.0 | 4.1 | |

EXAMPLES 15–23

The procedure of Examples 1–14 is repeated employing the following difficultly water-soluble compounds and as the solubilizer therefore the named agents:

| Insoluble Compound | Agent |
|---|---|
| (15) 6,6′-dichloro-4,4′-dimethyl thioindigo | N-methyl formanilide. |
| (16) 6,6′-dichloro-4,4′-dimethyl thioindigo | p-hydroxy formanilide. |
| (17) 6,6′-dichloro-4,4′-dimethyl thioindigo | N⁴-formyl-N¹,N¹-bis (2-hydroxy-ethyl) sulfanilamide (compound 29). |
| (18) 5,5′-dichloro-7,7′-dimethyl thioindigo | N-methyl formanilide. |
| (19) dibromoanthrone | N-methyl formanilide. |
| (20) dibromoanthrone | N-methyl-p-nitro formanilide. |
| (21) dimethoxydibenzanthrone | N-methyl formanilide. |
| (22) dimethoxydibenzanthrone | N-butyl formanilide. |
| (23) tribromoisodibenzanthrone | p-hydroxy formanilide. |

In the above Examples 15 through 23 the dyestuffs are employed as the sodium salts of the sulfuric acid esters of the leuco form of the dye. In each instance, the presence of the solubilizing agent greatly increases the solubility of the dyestuff ester salts both in water and in 1% aqueous sodium chloride solutions. The following examples illustrate the use of the solubilizers disclosed in this invention in the preparation of printing pastes. In this technology considerable difficulty is encountered in obtaining the desired degree of solubility of the dyestuff in the paste due primarily to the "salting out effect" of the various salts present in the paste leading to a diminution of the dyestuff solubility to the point where the printings obtained from such pastes are not satisfactory in so far as depth of shade and color are concerned.

EXAMPLE 24

A composition is prepared comprising the following ingredients:

(1) 4 parts of the sodium salt of the sulfuric acid ester of leuco 1,2-naphthioindigo
(2) 4 parts N-methyl formanilide
(3) 4 parts urea
(4) 50 parts of a neutral starch thickener
(5) 4 parts sodium chlorate solution (25%)
(6) 2 parts ammonium vanadate solution (1%)
(7) 2 parts 28% ammonia
(8) 2 parts 50% aqueous solution of gluconic solution The above formulation is made into a paste with sufficient hot water to give a total of 100 parts. When employed in the printing of cotton and rayon materials, there results after steaming, rinsing and drying, excellent and bright reddish brown prints. The development of the coloration is complete in 5 minutes.

EXAMPLE 25

The procedure of Example 24 is repeated except that p-hydroxide formanilide is employed in lieu of the N-methyl compound of that example. Again, excellent prints are obtained.

EXAMPLE 26

The procedures of Examples 24 and 25 are repeated using in lieu of the dyestuff of these examples, the sodium salts of the sulfuric acid ester of the leuco form of the following compounds:

(a) 6,6′-dichloro-4,4′-dimethylthioindigo
(b) 5,5′-dichloro-7,7′-dimethylthioindigo
(c) Dibromo anthanthrone The results obtained with such pastes when used in preparing prints on cotton and rayon are outstanding.

As pointed out above, the compounds contemplated as solubilizers in this invention are as equally efficacious in their action with other ionic compounds in addition to those specifically exemplified above. Thus barium sulfate, which is extremely insoluble in water, may be rendered many times more soluble in this medium by the use of a small amount of the solubilizers of this invention. In addition, while the above examples are directed to compounds manifesting an increased solubility in aqueous mediums, the compounds described in this invention are equally efficient in increasing the solubility of ionic structures in other polar solvents such as alcohols, etc., as described above.

This invention has been disclosed with respect to certain preferred embodiments. Various modifications and variations of these embodiments will become apparent to those skilled in the art, and it is to be understood that such modifications and variations are to be included within the spirit and purview of this application and the scope of the appended claims.

We claim:

1. A solution comprising a polar solvent, a formylated aromatic amine of the formula

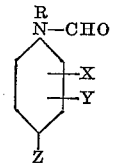

wherein R is selected from the group consisting of hydrogen, alkyl radical of from 1 to 5 carbon atoms, and hydroxyalkyl radical of from 1 to 5 carbon atoms, X is selected from the group consisting of hydrogen, hydroxyl, carboxyl, alkyl radical of from 1 to 5 carbon atoms and hydroxyalkyl radical of from 1 to 5 carbon atoms, Y is selected from the group consisting of hydrogen, alkyl radical of from 1 to 5 carbon atoms and hydroxyalkyl radical of from 1 to 5 carbon atoms, and Z is selected from the group consisting of H and

wherein $R_1$ and $R_2$ are selected from the group consisting of hydrogen, alkyl radical of from 1 to 5 carbon atoms and hydroxyalkyl radical of from 1 to 5 carbon atoms, and $R_1$ and $R_2$ may form a heterocyclic structure with the nitrogen atom, and a slightly soluble dissociable ionic compound, the latter being present in excess of that amount which is normally soluble in said polar solvent.

2. A solution as defined in claim 1 wherein the polar solvent is water.

3. A solution as defined in claim 2 wherein the ionic compound is a salt of an ester of a leuco vat dyestuff.

4. A solution as defined in claim 3 wherein the formylated aromatic amine is N-methyl formanilide.

5. A solution as defined in claim 3 wherein the formylated aromatic amine is N-(β-hydroxyethyl) formanilide.

6. A solution as defined in claim 3 wherein the formylated aromatic amine is p-hydroxy formanilide.

7. A solution as defined in claim 3 wherein the formylated aromatic amine is N-butyl formanilide.

8. A solution as defined in claim 3 wherein the formylated aromatic amine is N-methyl-p-nitro formanilide.

9. A dyestuff composition for printing textile fibers comprising an ester salt of a leuco vat dyestuff and a formylated aromatic amine of the formula

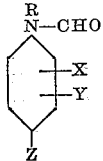

wherein R is selected from the group consisting of hydrogen, alkyl radical of from 1 to 5 carbon atoms, and hydroxyalkyl radical of from 1 to 5 carbon atoms, X is selected from the group consisting of hydrogen, hydroxyl, carboxyl, alkyl radical of from 1 to 5 carbon atoms and hydroxyalkyl radical of from 1 to 5 carbon atoms, Y is selected from the group consisting of hydrogen, alkyl radical of from 1 to 5 carbon atoms and hydroxyalkyl radical of from 1 to 5 carbon atoms, and Z is selected from the group consisting of H and

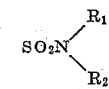

wherein $R_1$ and $R_2$ are selected from the group consisting of hydrogen, alkyl and hydroxyalkyl of from 1 to 5 carbon atoms, and $R_1$ and $R_2$ may form a heterocyclic ring structure with the nitrogen atom.

10. A dyestuff composition for printing textile fibers comprising an ester salt of a leuco vat dyestuff and N-methyl formanilide.

11. A dyestuff composition for printing textile fibers comprising an ester salt of a leuco vat dyestuff and N-(β-hydroxy-ethyl) formanilide.

12. A dyestuff composition for printing textile fibers comprising an ester salt of a leuco vat dyestuff and p-hydroxy formanilide.

13. A dyestuff composition for printing textile fibers comprising an ester salt of a leuco vat dyestuff and N-butyl formanilide.

14. A dyestuff composition for printing textile fibers comprising an ester salt of a leuco vat dyestuff and N-methyl-p-nitro formanilide.

References Cited in the file of this patent

UNITED STATES PATENTS

| | | |
|---|---|---|
| 2,647,815 | Buc | Aug. 4, 1953 |
| 2,721,211 | Buc | Oct. 18, 1955 |
| 2,728,794 | Buc | Dec. 27, 1955 |
| 2,809,984 | Buc | Oct. 15, 1957 |
| 2,872,277 | Kirk | Feb. 3, 1959 |

OTHER REFERENCES

Diserens: The Chemical Technology of Dyeing and Printing, vol. 1, 1948, pp. 8–13, Rheinhold Pub. Co.

UNITED STATES PATENT OFFICE

CERTIFICATION OF CORRECTION

Patent No. 2,953,423            September 20, 1960

Saul R. Buc

It is hereby certified that error appears in the above numbered patent requiring correction and that the said Letters Patent should read as corrected below.

Column 8, line 9, after "alkyl" insert -- radical of from 1 to 5 carbon atoms --; same line, after "hydroxyalkyl" insert -- radical --.

Signed and sealed this 13th day of June 1961.

(SEAL)
Attest:

ERNEST W. SWIDER            DAVID L. LADD
Attesting Officer            Commissioner of Patents